Oct. 20, 1936.    M. KAHN    2,057,955
RAILS FOR VEHICLES RUNNING ON RAILS
Filed July 7, 1933
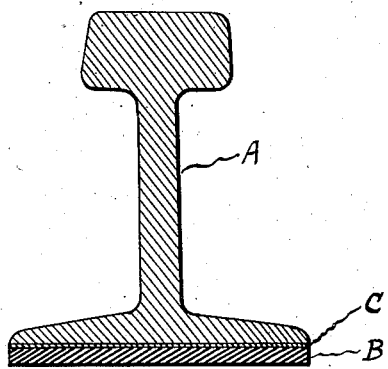
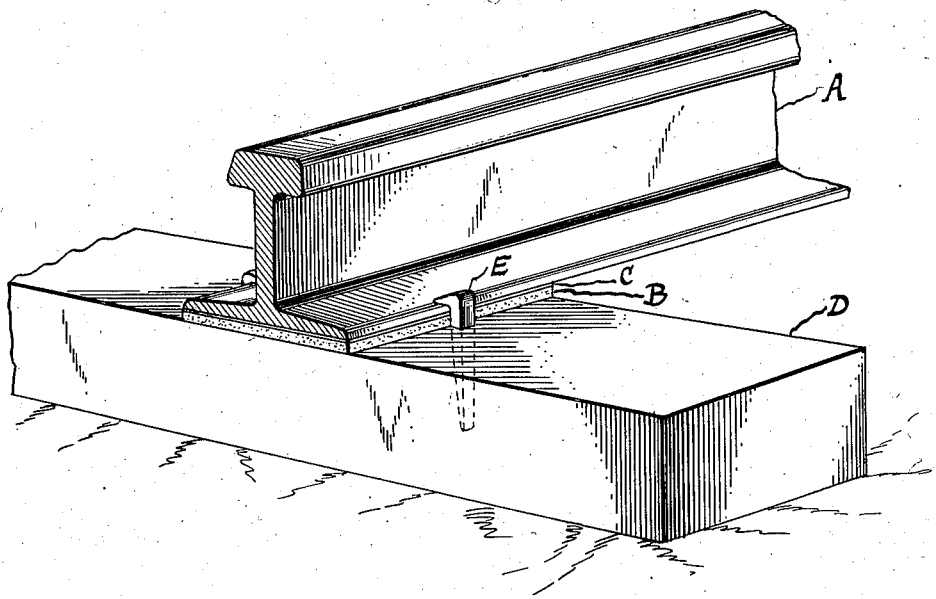
Inventor
Myrtil Kahn
By Potter, Pierce & Scheffler
Attorneys Patented Oct. 20, 1936

2,057,955

UNITED STATES PATENT OFFICE 2,057,955

RAILS FOR VEHICLES RUNNING ON RAILS

Myrtil Kahn, Cologne-Riehl, Germany

Application July 7, 1933, Serial No. 679,331
In Germany October 11, 1932

1 Claim. (Cl. 238—283)

The present invention relates to rails for vehicles running on rails.

The noise of heavy cars, trains, tramcars and the like is most unpleasant especially in residential quarters and detracts from the comfort of the passengers.

The object of this invention is to overcome this disadvantage.

According to this invention firmly adhering sheets of rubber or rubber-like material, prepared by customary methods, are provided at the bottom of rails. The sheets, moreover, have a cushioning effect and substantially eliminate the unpleasant noise. These advantages are obtained without essential loss of rigidity of the tracks.

The coating of the rails may be carried out in any known manner, for example, by those described in the U. S. Patent No. 1,732,886, in India Rubber World of 1st June 1932, page 50, or on page 1325 of Industrial and Engineering Chemistry, vol. 19, 1927. According to these disclosures thin layers of rubber or similar rubber-like materials, such as guttapercha or balata, are applied to metal and especially to iron in order to protect the metal from rust or corrosion, these layers being of the nature of so-called isomerized rubber. This method may be used in the present invention and, while these layers are still tacky, sheets of a rubber material, that is of rubber or of a rubber-like material, of suitable size and of about 1 cm. thickness are pressed on to the rails so that they are firmly secured. On the other hand, sheets of rubber may be treated on one surface while heating with the agents employed for preparing isomerized rubber, that is a thermoplastic variety of rubber, the hot sheets being then applied to the rails, preferably heated to about the same temperature as the sheets of rubber.

The layers of rubber material may be applied either to the whole of the rail bottom or only to those portions bearing on the sleepers. With such a method the layers of rubber material are effectively protected against heat and mechanical attack of any kind so that the said layers will last much longer than those applied to the upper side of the head of the rails or to the rim of the wheels. The pressure of the wheels and their load moreover is more uniformly distributed upon the layers owing to the breadth of the bottom of the rails since this is usually of greater area than that of the head of the rails. Since the layers of rubber material are firmly combined with the rails no shifting or tearing off of the layers can occur.

In the accompanying drawing

Fig. 1 is a vertical cross sectional view of a railway rail cushioned in accordance with the present invention, and Fig. 2 is a perspective view of the cushioned rail of Fig. 1 in place on a supporting tie.

In the figures, A denotes the metal rail, B denotes a layer of cushioning rubber and C denotes the interposed adhesive layer binding layer B to the undersurface of rail A. D denotes a conventional railway tie to which the cushioned rail is conventionally secured as by spike E.

In preparing a rail the bottom of the same is wholly or partially coated with the tacky rubber isomer and, while the coating is still tacky, sheets of soft vulcanized rubber of the breadth of the rail bottom and of about 1 cm. thickness are pressed on and after a certain time the sheets of rubber will be found to adhere firmly to the rails. In underground railway tracks either with continuous sheets of rubber when the rails are secured directly to the ground or with intermittent coatings when the rails are fixed to sleepers, most of the customary noise is eliminated and the vehicles ride more smoothly and quietly.

I claim:—

A cushioned railway rail comprising a metallic wheel-supporting rail member and resilient vulcanized rubber attached thereto by means of an interposed strongly adhesive thermoplastic isomerized rubber material, applied under heat and pressure, said rubber covering all of the surfaces of the rail member which when in use serve as its supporting surfaces and said rubber being otherwise free from any fixed attachment, whereby the rail member and rubber may be handled as a unit and the rail may have cushioned movement on support means therefor.

MYRTIL KAHN.